US012743460B1

(12) United States Patent
Panaskar et al.

(10) Patent No.: US 12,743,460 B1
(45) Date of Patent: Sep. 22, 2026

(54) COMPUTATIONALLY EFFICIENT DATA SET CLUSTERING USING PARTITIONING AND ITERATIVE REFINEMENT

(71) Applicant: Amazon Technologies, Inc., Seattle, WA (US)

(72) Inventors: Ganesh Ramesh Panaskar, Mill Creek, WA (US); Sankalp Verma, Sammamish, WA (US); Rishi Bhasin, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/087,292

(22) Filed: Mar. 21, 2025

(51) Int. Cl.
*G06F 16/355* (2025.01)

(52) U.S. Cl.
CPC .................................. *G06F 16/355* (2019.01)

(58) Field of Classification Search
CPC ..................................................... G06F 16/355
USPC .......................................................... 707/737
See application file for complete search history.

(56) References Cited

U.S. PATENT DOCUMENTS 9,280,593 B1 * 3/2016 Dykstra ................ G06F 16/285
9,727,633 B1 * 8/2017 Dykstra ................ G06F 16/285
10,394,913 B1 * 8/2019 Chaoji .............. G06F 18/23213
2008/0215314 A1 * 9/2008 Spangler ........... G06F 18/23213
704/10
2014/0359626 A1 * 12/2014 Guedalia ................ G06N 5/043
718/101

* cited by examiner

*Primary Examiner* — Michael Pham
(74) *Attorney, Agent, or Firm* — Knobbe, Martens, Olson & Bear, LLP

(57) ABSTRACT

Systems and methods are disclosed for implementation of a scalable and efficient scaling algorithm for clustering data objects within a data set, as well as implementation of the algorithm to control content generation and selection. A data set can be initially divided randomly into subsets. A base clustering algorithm, such as k-means clustering, can be applied in parallel to each subset to identify a set of local centroids representative of local clusters within each subset. The local centroids can be aggregated from across subsets and the base clustering algorithm can be applied to the aggregated local centroids to result in global clusters. Data objects associated with each global cluster (such as by being clustered within a local cluster corresponding to a global cluster) represent a global clustering of the data set. These global clusters can form the basis for additional iterations of local and global clustering, further refining global clustering.

20 Claims, 9 Drawing Sheets

500

COMPUTATIONALLY EFFICIENT DATA SET CLUSTERING USING PARTITIONING AND ITERATIVE REFINEMENT

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

In some instances, the amount of data potentially relevant to an end user of a computing system is large, and it is desirable to identify particular data objects most likely to be relevant to a user. One approach to such identification is to conduct a similarity search, whereby data objects are assigned one or more values corresponding to one or more attributes, and are then grouped according to those values. Given the groupings, other objects that are similar to a given data object can be located. A variety of clustering algorithms exist to conduct such grouping. In one approach, a clustering algorithm involves comparing each data object to all other data objects to identify similarities. However, as the size of a data set becomes large-such as on the order of millions of objects-such many-to-many comparisons become computationally inefficient and difficult to implement.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
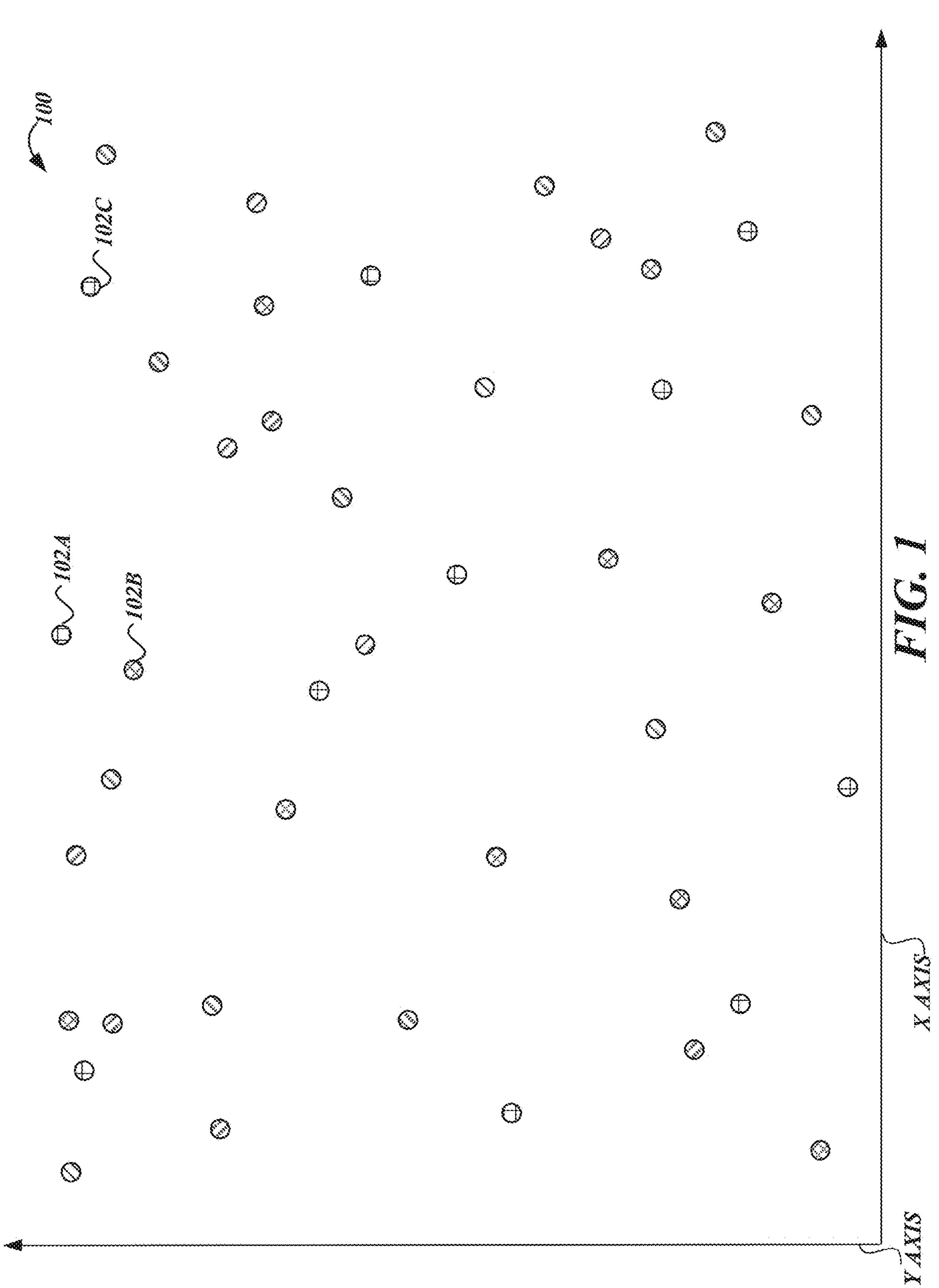
FIGS. 1-4 provide a visual depiction of a data set clustered according to an example partitioned clustering algorithm as disclosed herein.

Generally described, aspects of the present disclosure relate to a scalable and computationally efficient scaling algorithm for clustering data objects within a data set, as well as implementation of the algorithm to control content generated by a computing device. As described herein, a clustering algorithm is a programmatic mechanism to group data objects according to a similarity criteria, such that each group contains similar data objects. In one embodiment, each data object is represented by a multidimensional vector, with a value of each dimension representing a quantitative attribute of the object such that objects close together in multidimensional space are considered similar. A clustering algorithm therefore identifies groups of objects within the multidimensional space according to the closeness of those objects in the space. Clustering algorithms are fundamental to a number of processes in computer systems. For example, clustering may be used to implement data searches, content recommendations, content organization, detect fraud or abusive behavior, and to conduct retrieval augmented generation (RAG) for artificial intelligence (AI) application. While a variety of clustering algorithms exist, the computational complexity of those algorithms generally increases as a function of the number of data objects being clustered. Moreover, these algorithms are often limited in parallelizability, as optimal results may require global consideration of a data set. As a number of objects increases to large amounts—such as on the order of millions or more data objects—these existing clustering algorithms can become computationally inefficient or infeasible. Embodiments of the present disclosure address this problem by providing for scalable and efficient clustering using partitioning and iterative refinement. As disclosed herein, a dataset may be initially partitioned, such that a base clustering algorithm can be applied to a smaller subset of the data. The results of this base clustering algorithm can then be used to reallocate objects into a new partitioning that more closely aligns with optimal clustering for the overall dataset. This process can be iteratively applied, such that partitions approach an optimal global clustering. As a result, even massive datasets can be clustered without requiring that any base clustering algorithm be applied to all data objects in the set. Accordingly, the parallelizability and computational efficiency of the partitioned clustering algorithm disclosed herein is increased relative to existing clustering algorithms, enabling clustering of even extremely large datasets.

One example of an existing clustering algorithm is k-means clustering ("k-means"). Generally described, k-means functions by randomly selecting k centroids within a dimensional space representing a set of data objects, with each data object having a point within that dimensional space, and with k being a configurable value. In k-means, each data object is then assigned to the nearest centroid, forming temporary groups. New centroids are then determined at the average position of the data objects in each temporary group, and objects are reassigned to new temporary groups based on their proximity to the new centroids. This centroid creation and temporary group reassignment continues until the algorithm converges to a stable grouping, or until stopped. While k-means provides is useful in many circumstances, it can be problematic when dealing with very large datasets. For example, because objects are frequently reassigned to temporary groups, parallelization of the algorithm can be difficult or require significant synchronization between parallel implementers. Other clustering algorithms exist, each of which presents difficulties when applied to extremely large datasets.

Embodiments of the present disclosure address these problems by providing for a highly scalable, computationally efficient clustering algorithm. Specifically, an iterative algorithm is disclosed herein that partitions a data set into subsets and applies a base clustering algorithm (such as k-means, among others) to each subset. Results of this base clustering algorithm are then used to re-allocate data objects of the data set into new partitions, whereby the process may continue. Even with a relatively low number of iterations (3 or 4, in some embodiments), the partitioned clustering algorithm as disclosed herein can provide results similar or superior to existing clustering algorithms while reducing computational complexity and increasing parallelizability.

The partitioned clustering algorithm disclosed herein will be described in more detail with respect to FIGS. 1-4, which provide a visual depiction of a data set clustered according to the partitioned clustering algorithm.

As shown in FIG. 1, the data set 100 includes a variety of data objects 102 (e.g., objects 102A and 102B in FIG. 1) distributed in a two-dimensional space, represented by X and Y axes. Each data object 102 is illustratively represented as a two-dimensional vector, with an X and Y value corresponding to their positions along respective axes in FIG. 1. While FIG. 1 depicts two-dimensional data objects 102, in practice data objects of higher dimensionality may be clustered. For example, data objects 102 may be represented as vectors have tens, hundreds, thousands, or more dimensions. Each dimension can represent a quantitative aspect of the data object 102. In some instances, each aspect may be human-assigned, such as the price of a purchasable good, the size of a physical object, a human-assigned quality metric, or the like. In other instances, aspects may be machine-learned. For example, data objects 102 may be assigned a location in vector space according to a machine learning algorithm, such as an embedding algorithm, with values for each dimension assigned by the algorithm (potentially untethered from an explainable or human-ascribable aspect).

In a variety of contexts, it may be desirable to cluster the data objects 102 according to their relative locations within multidimensional space. For example, if data objects 102 represent content items (e.g., media such as television content, movies, music; physical objects; purchasable services; or the like), it may be desirable to determine that a first content item represented as data object 102A is located proximate to a second content item represented as data object 102B in the multidimensional space, such that a user choosing to consume the first content item may be recommended to also consume the second content item. While recommendation systems are one example of the utility of clustering, others are possible and discussed in more detail below.

While clustering a relatively small number of data objects in a relatively small dimensionality (such as those visualized in FIG. 1) may be trivial, such clustering increases in complexity as the number of data items and dimensions increases. In practice, it may be desirable to cluster millions (or more) data objects of high (e.g., hundreds, thousands, or more) dimensionality. Such clustering can be difficult or computationally inefficient using existing clustering algorithms.

To address such problems, embodiments of the present disclosure can include partitioning a data set into multiple subsets. In one embodiment, partitioning occurs randomly. For example, a hash function may be applied to a vector for each data object to assign each data object to one of b subsets (where b is a configurable parameter representing a number of partitions or "batches"). Any variety of hash functions may be applied. However, it may be desirable to select a hash function that relatively evenly divides data objects among subsets. As one example, a unique value for each data object, such as a key value (e.g., a globally unique identifier or "GUID" or a universally unique identifier or "UUID") or a concatenation of the vector values of each data object, can be the subject of modulus division to assign each data object to a partition (e.g., where partition number is equal to the unique value modulo the value of b). In FIG. 1, this division is represented by distinct patterns for each data object 102. For example, data object 102A (shown as filled with a vertical and horizontal hashing pattern) is assigned to a first partition, while data object 102B (shown as filled with a cross diagonal hashing pattern) is assigned to a second partition.

Thereafter, a base clustering algorithm can be separately applied to each subset. Because the number of data objects 102 in each subset is reduced to n/b (where n is the number of data objects 102 in the entire data set), clustering each subset requires significantly fewer computational resources than clustering the entire data set. Moreover, such clustering can occur entirely in parallel, increasing parallelization of the overall algorithm.

Figure 2:
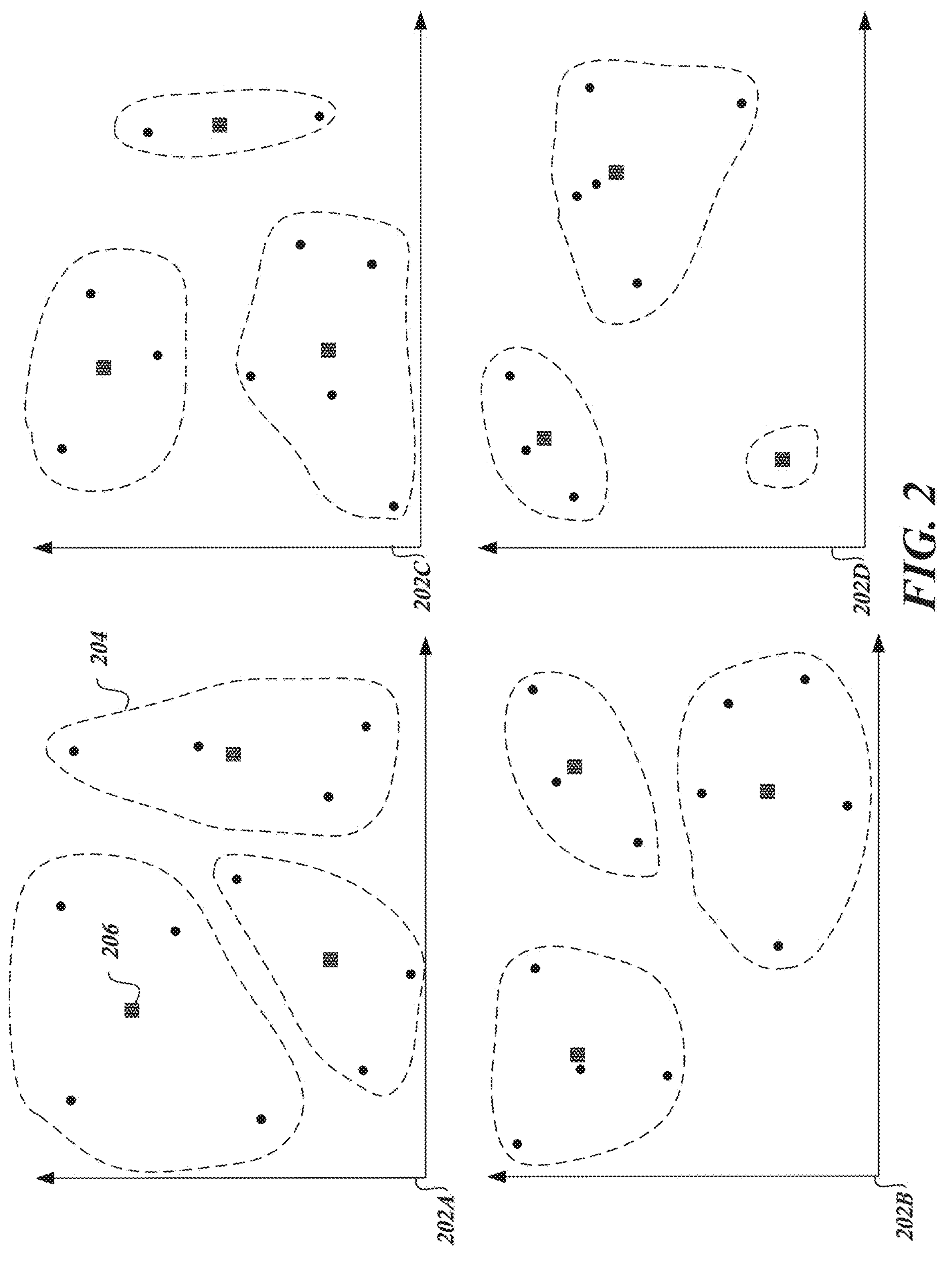

Illustrative results of application of a base clustering algorithm to individual subsets are shown in FIG. 2. Specifically, FIG. 2 depicts a set of graphs 202A-D, each of which represents a distinct subset of data objects 102 from the data set 100 (e.g., according a random selection from the data set 100, such as via hashing, which is illustratively represented by fill pattern of each data object 102 in FIG. 1). FIG. 2 further depicts groupings 204 of the data objects 102 according to application of a base clustering algorithm. For example, k-means clustering may be applied to the objects 102 of a distinct subset to cluster the subset into k clusters. While k-means is discussed illustratively herein, subsets may be clustered according to other base clustering algorithms, a variety of which are known in the art. Examples include k-medians, Clustering Large Applications based upon RANdomized Search (CLARANS), hierarchical and agglomerative clustering, and spatial clustering (e.g., Density-Based Spatial Clustering of Applications with Noise or "DBSCAN").

Clusters within each subset may be referred to herein as "local clusters." In one embodiment, the number of local clusters is equal across subsets. This number may be a configurable parameter. In other embodiment, the number of local clusters may vary dynamically, such as based on the number of data objects within each subset. For example, the number of local clusters may be equal to the square root of the number of data objects, or a multiple of the the square root of the number of data objects (where the multiple is a configurable parameter). Increasing the number of local clusters can generally increase a speed of convergence of the iterative partitioned clustering algorithm disclosed herein; however, increasing the number of local clusters may also increase computational complexity. Accordingly, a number of local clusters may be tuned according to the data set being clustered and the computational resources available to implement the iterative partitioned clustering algorithm.

In FIG. 2, three local clusters are identified (e.g., via k-means) within each subset. As a result, twelve total local clusters (three per subset with four subsets) are identified. Notably, because subsets are independently processed, identification of local clusters can occur entirely independently and is thus a highly parallelizable operation.

In addition, FIG. 2 depicts the identification of a local centroid 206 for each local cluster. The local centroid 206 can be determined according to a distance of data objects 102 within each cluster (e.g., according to mean or median distance, where distance may be for example Euclidean distance). As discussed in more detail below, the local centroids 206 can be used to redistribute data objects 102 between subsets, such that the iterative partitioned clustering algorithm can proceed to subsequent iterations.

Figure 3:
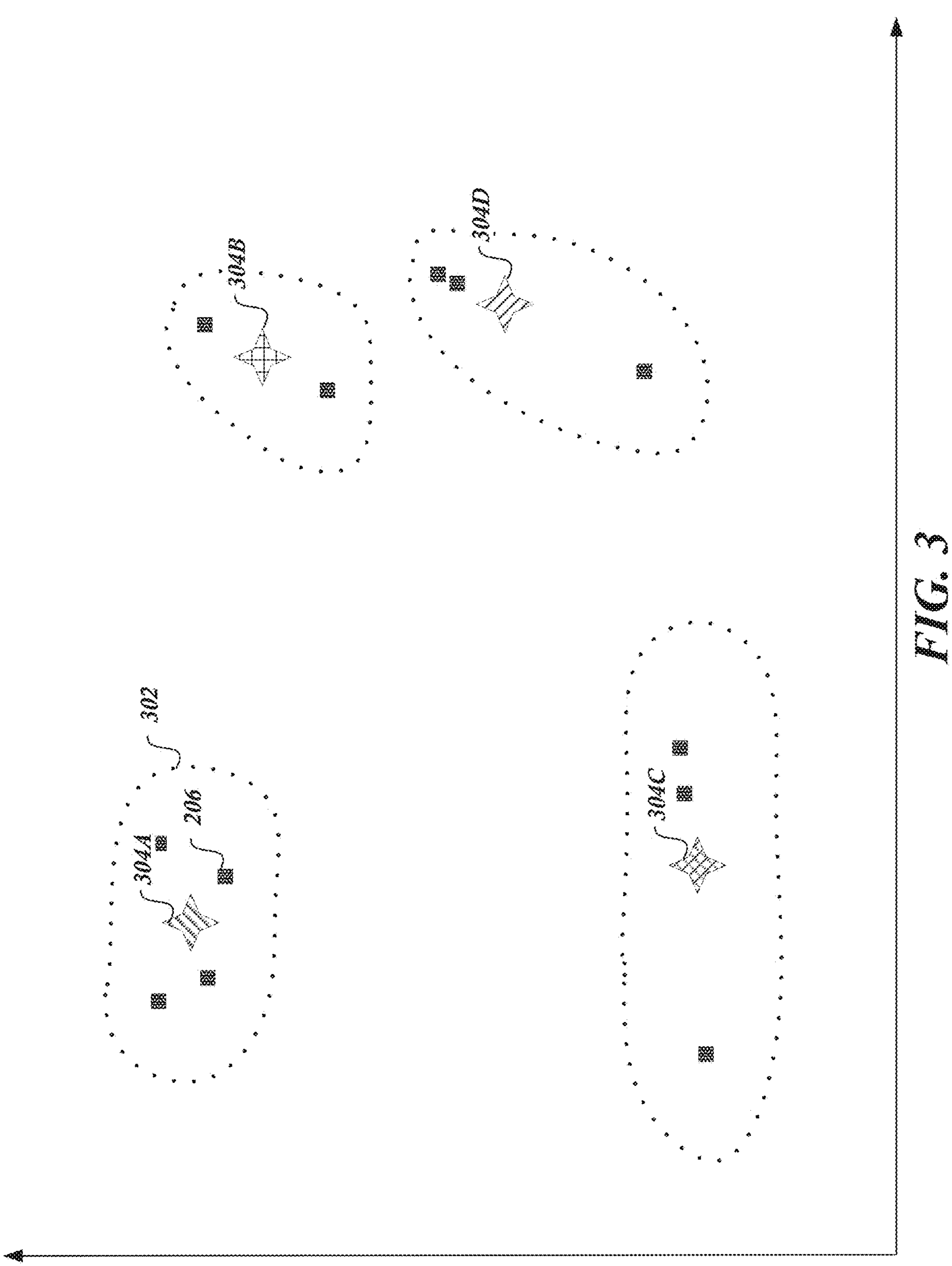

Specifically, FIG. 3 depicts how the local centroids 206 of each subset (e.g., as shown in FIG. 2) are arranged within the same multi-dimensional space. When considered in aggregate, the iterative partitioned clustering algorithm disclosed herein can proceed to cluster these local centroids 206 into global clusters 302, which can subsequently be used to redistribute data objects 102 between subsets and thus continue the iterative partitioned clustering algorithm. Any number of base clustering algorithms, such as those identified above, may be used to identify global clusters 302. In one embodiment, the same base clustering algorithm is used to generate local clusters 204 and global clusters 302. In one embodiment, the number of global clusters 302 is equal to the number of subsets or batches. As will be apparent from the discussion below, this provides for a stable number of batches across iterations of the iterative partitioned clustering algorithm. Notably, clustering the local centroids 206 is significantly less computationally complex than clustering of data objects 102, because the number of number of local centroids 206 is reduced relative to the number of data objects 102. Specifically, the number of local centroids can be controlled as b*k, where b is the number of subsets or batches and k is the number of local clusters. Accordingly, the computational complexity of identifying global clusters 302 can be controlled independently of the size of the data set 100. Moreover, identifying global clusters 302 can occur without requiring knowledge of the data set 100, improving the efficiency of synchronization when implementing the iterative partitioned clustering algorithm disclosed herein within distributed systems. That is, should different computing devices implement local clustering and global clustering, a device implementing local clustering may be required only to communicate to the device implementing global clustering the identified local centroids 206, which can require significantly less communication than conveying individual data objects 102.

Similarly to FIG. 2, FIG. 3 also depicts centroids for the identified clusters. More specifically, FIG. 3 depicts that each global cluster 302 (formed from a collection of local centroids 206 aggregated across subsets) has an associated global centroid 304 (shown in FIG. 3 as centroids 304A-D). Global centroids 304 can be determined similarly to local centroids 206, according to a distance metric of the relevant objects (that is, local centroids 206, to which the global centroids 304 represent a center).

Figure 4:
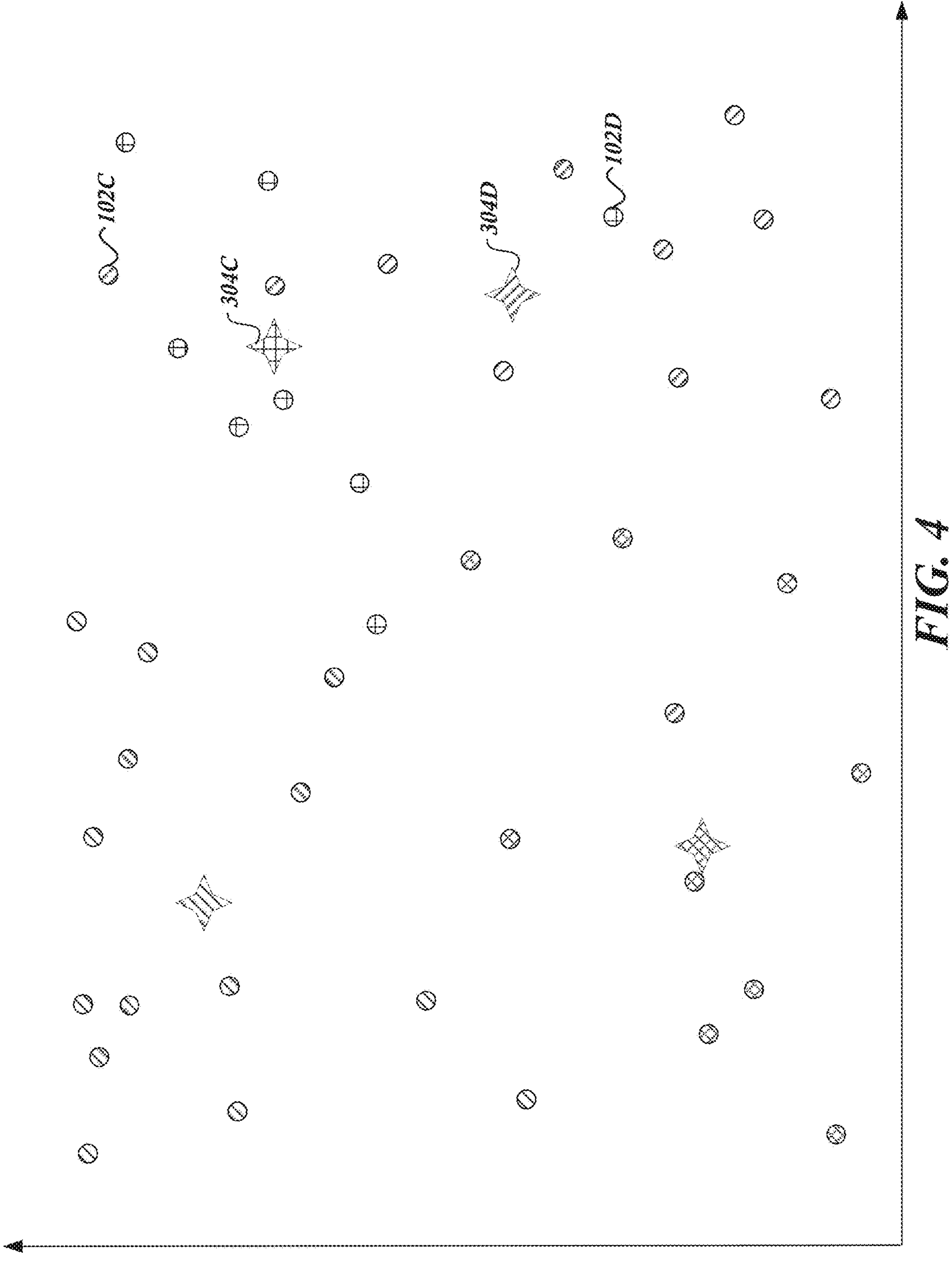

The determined global centroids can then be used to repartition data objects among subsets. Specifically, the data objects 102 associated with each local centroid 206 can be grouped together into a new subset of the overall data set 100. This repartitioning is depicted in FIG. 4. Specifically, in FIG. 4, data objects 102 have been repartitioned such that objects 102 within a local cluster 302 corresponding to a local centroid 206 within a global cluster 302 are grouped within the same subset. This is visually depicted via fill patterns in FIG. 4. For example, in FIG. 4, both data objects 102A and 102B are associated with global centroid 304A, because both data objects 102A and 102B were associated with local clusters 204 whose respective local centroids 206 were later clustered to result in global centroid 304A.

While global centroids 304A are depicted herein for ease of description, in some embodiments determination of global centroids 304 may be omitted. For example, global clusters 302 may be determined without or independent of determination of a global centroid 304, and data objects 102 may be repartitioned based on their respective local centroid 206 and the global cluster 302 in which that local centroid 206 has been grouped.

As can be seen in FIG. 4, after a single iteration, the subsets of data objects102 begin to resemble a global clustering of the data set 100, despite no individual operation considering the collective data set 100 in its entirety. Rather, the iterative partitioned clustering algorithm can enable clustering of the data set 100 while enabling only portions (e.g., subsets and local centroids 206) to be considered at each operation. As such, the parallelizability and efficiency of the iterative partitioned clustering algorithm can vastly exceed other clustering algorithms.

In some cases, the iterative partitioned clustering algorithm disclosed herein may result in incomplete clustering of data objects 102. For example, in FIG. 4, data object 102C is grouped with global centroid 304D, despite being more proximate to global centroid 304C. Conversely, data object 102D is grouped with global centroid 304C, despite being more proximate to global centroid 304D. To address this issue, the above-noted operations can be repeated. Specifically, the new subsets identified in FIG. 4 can be subject to the operations described above with respect to FIGS. 2 and 3, to result in yet more new subsets. The number of iterations can be a configurable parameter. In different embodiments, the number of iterations is set to 2, 3, 4, or more. Generally, additional iterations of these operations can result in a more accurate clustering of data objects at the cost of increased use of computational resources, including time.

Figure 5:
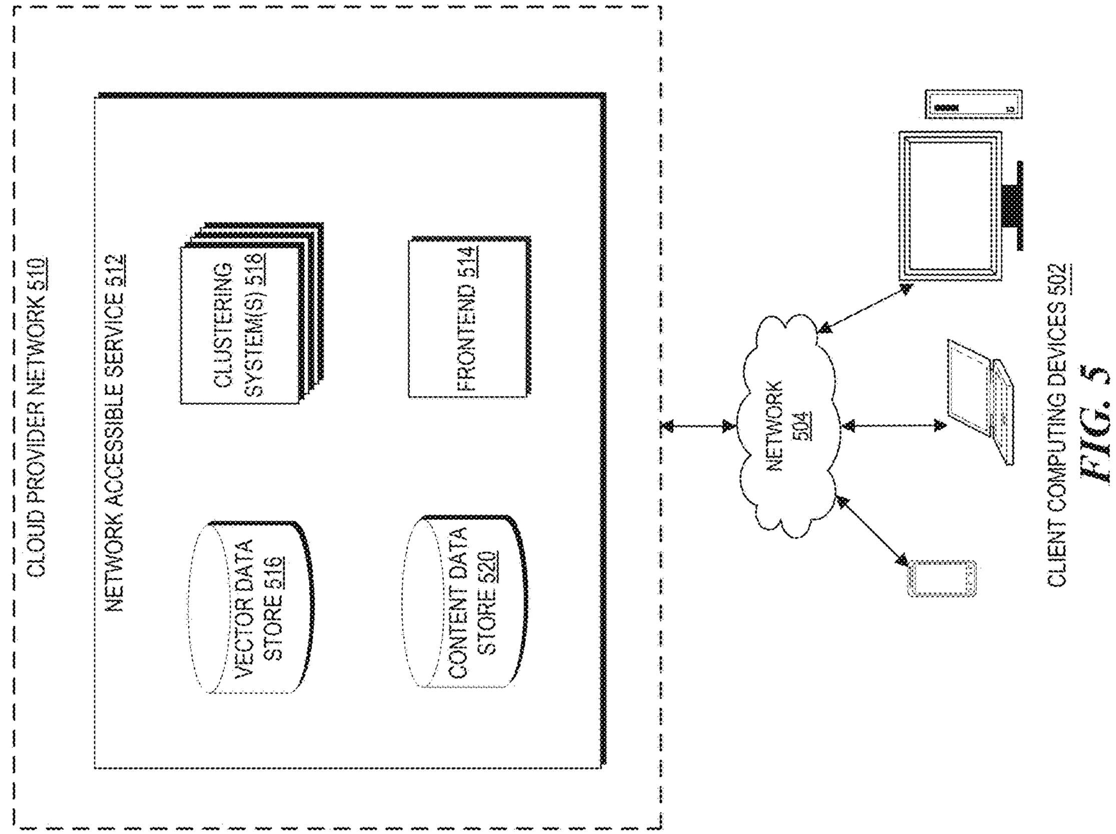
FIG. 5 depicts an example computing environment in which embodiments of the present disclosure can be implemented

FIG. 5 depicts an example computing environment 500 including a cloud provider environment 510 in which embodiments of the present disclosure can be implemented. The cloud provider environment 510 can be accessed by client computing devices 502 over a network 504.

A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider environment 510 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud provider environment 510 may provide a wide variety of resources. In general, such resources correspond to various configurations of computing devices, including computational resources (e.g., processors, such as central processing units (CPUs), graphical processing units (GPUs), machine learning accelerators, or the like) and storage resources (e.g., random access memory, persistent storage of various configurations, etc.). For example, a cloud provider network may provide resources in the form of virtual machine instances on a compute service, virtual storage drives on a block storage service, and object storage locations object storage service. Some implementations of cloud provider environment 510 can additionally include domain name services ("DNS") services, object storage services, relational database services, and other service configurations (not illustrated). Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces (GUIs), command line interfaces (CLIs), application programming interfaces (APIs)) enabling end users, via user computing devices 502, to access and configure resources provided by the various services.

In one example, the cloud provider environment 510 can provide on-demand, scalable computing environments to users, for example allowing users to have at their disposal scalable "virtual computing devices" via their use of a compute service and block storage service. These virtual computing devices have attributes of a personal computing device including hardware (e.g., various types of processors, local memory, random access memory ("RAM"), hard-disk and/or solid state drive ("SSD") storage, etc.), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider environment 510 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

As illustrated in FIG. 5, the cloud provider environment 510 can communicate over network 504 with client computing devices 502. The network 504 can include any appropriate network, including an intranet, the Internet, a cellular network, a local area network or any other such network or combination thereof. In the illustrated embodiment, the network 504 is the Internet. Protocols and components for communicating via the Internet or any of the other aforementioned types of communication networks are known to those skilled in the art of computer communications and thus, need not be described in more detail herein. Client computing devices 502 can include any network-equipped computing device, for example desktop computers, laptops, smartphones, tablets, e-readers, gaming consoles, and the like. Users can access the cloud provider environment 510 via the network 504 to view or manage their data and computing resources, as well as to use websites and/or applications hosted by the cloud provider environment 510.

In FIG. 5, the cloud provider environment 510 provides a network-accessible service 512. In general, the network-accessible service 512 is representative of any service including content to be provided to client computing devices 502, including content networks (e.g., music or video content provider networks), marketplaces, generative artificial intelligence services, or the like. Content is illustratively stored within content data store 520.

As discussed above, in a wide variety of contexts, network accessible services 512 may provide content that can be grouped, sorted, or categorized according to quantitative attributes. The attributes of different content can be represented as a multidimensional vector (e.g., a series of numerical values, with each value representing a dimension of the vector). Such vectors are illustratively stored within the vector data store 516.

The content data store 520 and vector data store 516 illustratively represents any of a variety of known data stores (e.g., disk drives, solid state drives, or the like). The data stores may represent, for example, cloud-based block storage or object storage, a relational or non-relational database, a key-value store, or the like.

To provide content to client computing devices 502, the network accessible service 512 includes a frontend 514 configured to interface with client computing devices 502, to select content to provide to the devices 502, and to return that content to the devices 502. For example, the frontend 514 may represent a computing device configured to provide a web-based interface, an application programming interface (API), a command line interface (CLI), a graphical user interface (GUI), or the like to client computing devices 502.

As discussed above, selection of content to return to a client computing device 502 can in some instances be facilitated based on similarities of different content items. For example, a recommendation system may recommend content to a user of a client computing device 502 based on the recommended content's similarity to other content provided to or associated with a user. Similarly, a search system may include in search results both an initial content associated with search criteria and other similar content. Similarity between content items can be quantified, for example, according to a proximity of vectors for the content, as reflected within data of the vector data store 516. Accordingly, it may be desirable to include within the vector data store 516 labels for clusters of related (e.g., similar or proximate) vectors, corresponding to clusters of related content. While recommendations and search are provided herein as example use cases for vector clustering, others exist. For example, vector clustering may be utilized to identify related groups of users (e.g., where a vector represents attributes of the user, such as a history of interactions with the network accessible service) for various purposes, such as detection of fraud (e.g., where multiple users acting fraudulently are grouped together for analysis or identification) or other analysis. Similarly, vector clustering may be used to group together other information, such as interaction history on the network accessible service, for analysis such as optimization of operations on the service 512.

To facilitate clustering or grouping of vectors within the vector data store 516, the network accessible service 512 includes one or more clustering systems 518. Each clustering system 518 illustratively represents a computing device configured to implement all or a portion of the iterative partitioned clustering algorithm disclosed herein (e.g., as discussed above, described in connection with the routine 700 described below, etc.). Accordingly, the clustering systems 518 may read vectors from the vector data store 516, cluster the vectors as data objects according to the iterative partitioned clustering algorithm disclosed herein, and associate each cluster with a label, stored within the vector data store 516, identifying their respective groupings/clusterings. In one embodiment, the clustering systems 518 operate as a highly distributed system for conducting the iterative partitioned clustering algorithm disclosed herein. For example, the system 518 may implement a MapReduce-style distribution, whereby a given clustering system 518 divides vectors of a dataset into subsets and distributes to one or more clustering systems 518 instructs to apply a base clustering algorithm to the vectors of each subset to determine local cluster centroids, which local cluster centroids are returned to the given clustering system 518 for determination of global clusters and repartitioning of the vectors among the subsets. Such parallelized operation can enable the iterative partitioned clustering algorithm disclosed herein to be implemented in a highly scalable and efficient manner (in terms of computing resource usage, such as processing cycles and bandwidth usage).

While shown in FIG. 5 as part of the network accessible service 512, clustering systems 518 may in some embodiments be implemented separately from the network accessible service 512. For example, clustering systems 518 may be implemented as a distinct service within the environment 510 or within a different environment in communication with the service 512 via the network 504. In some instances, clustering systems 518 may be implemented using a serverless execution environment of the cloud provider environment 510. For example, individual operations of the iterative partitioned clustering algorithm disclosed herein may be implemented as code loaded into a serverless orchestration service (sometimes referred to as "step functions", "durable functions", or "workflows"), such that the number and configuration of clustering systems 518 can scale dynamically during implementation of the iterative partitioned clustering algorithm.

Figure 6:
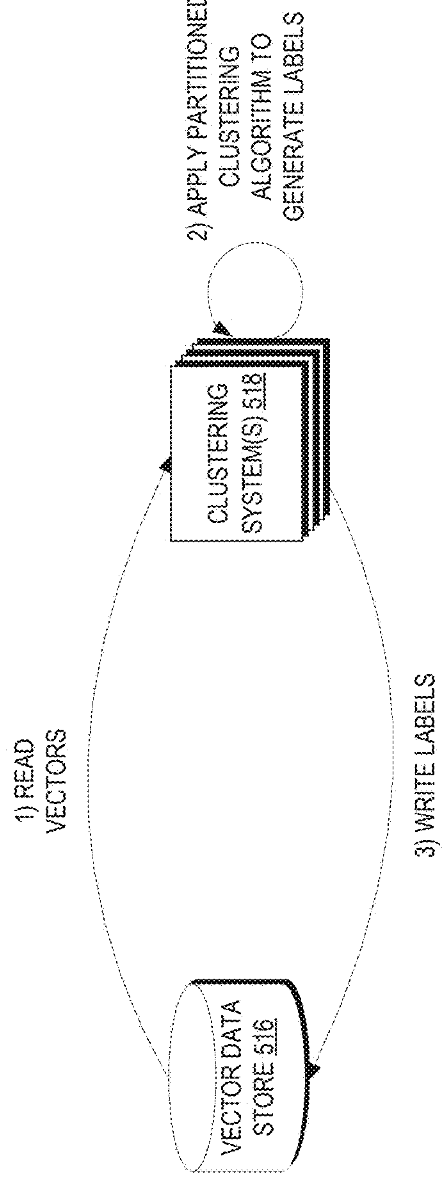
FIG. 6 depicts illustrative interactions for implementing an iterative partitioned clustering algorithm as disclosed herein.

With reference to FIG. 6, illustrative interactions will be described for implementing an iterative partitioned clustering algorithm as disclosed herein. The interactions of FIG. 6 begin at (1), where the clustering systems 518 read vectors from the vector data store 516. As discussed above, the vectors illustratively represent multidimensional quantitative attribute values for content associated with a network accessible service 512, such as data items to be recommended to users, user data related to interaction with the service 512, or the like. Pursuant to embodiments of the present disclosure, it may be desirable to cluster such vectors to support functionality of the network accessible service 512, such as recommendations, fraud detection, content generation, or the like.

Accordingly, at (2), the clustering systems 518 implement a partitioned clustering algorithm as disclosed herein. For example, the systems 518 may implement the routine 800 of FIG. 8. Briefly, a partitioned clustering algorithm as disclosed herein can include 1) partitioning a data set of vectors into multiple subsets, 2) applying a base clustering algorithm (e.g., k-means, k-medians, CLARANS, DBSCAN, hierarchical and agglomerative clustering, etc.) independently to each subset to identify clusters within each subset, 3) identifying a centroid of each cluster (a "local centroid"), 4) clustering an aggregation of the local centroids across subsets to result in global clusters, 5) identifying clusters of data items using the global clusters. In some instances, the algorithm is iterative, whereby the clusters identified using global clusters form new subsets to which the algorithm is once again applied.

Thereafter, at (3), labels are written to the vector data store 516 according to the identified clusters. For example, clusters may be assigned numerical values (e.g., clusters 1-*n*, where n is a total number of clusters) which may be appended to a vector (e.g., as a new dimensional value). In such cases, the cluster value of a vector may be ignored for purposes of application of a clustering algorithm. In another example, a vector label for a cluster may be stored separately from the vector.

While FIG. 6 shows a single read and write operation respectively, in some instances the interactions may include multiple read and write operations. Illustratively, clustering systems 518 may be configured to determine subsets of a data set without reading the data set, and to parallelize processing of the subsets among different clustering systems 518. In such an instance, the different parallelized clustering systems 518 may independently retrieve the relevant subsets from the vector data store 516 using multiple read operations. As one example, the vector data store 516 may support specification of a hash operation (e.g., modulus division) within a query, and each clustering system 518 can be configured to query the vector data store 516 for data items of a subset by specification of the hash operation and a subset value within a query (e.g., a query for items where value modulo n equals a, where n is a number of subsets and a is a particular subset the clustering system 518 is processing). Similarly, independent clustering systems 518 may write labels for different data items independently to the vector data store 516, resulting in multiple write operations.

In some instances, clustering system 518 may communicate among themselves to implement a partitioned clustering algorithm, such as using a MapReduce communication pattern, as noted above. In some instances, intermediate data (such as local centroids, global centroids, intermediate subsets, etc.) may be written to the vector data store 516. In other instances, intermediate data may be stored at the clustering systems 518.

Figure 7:
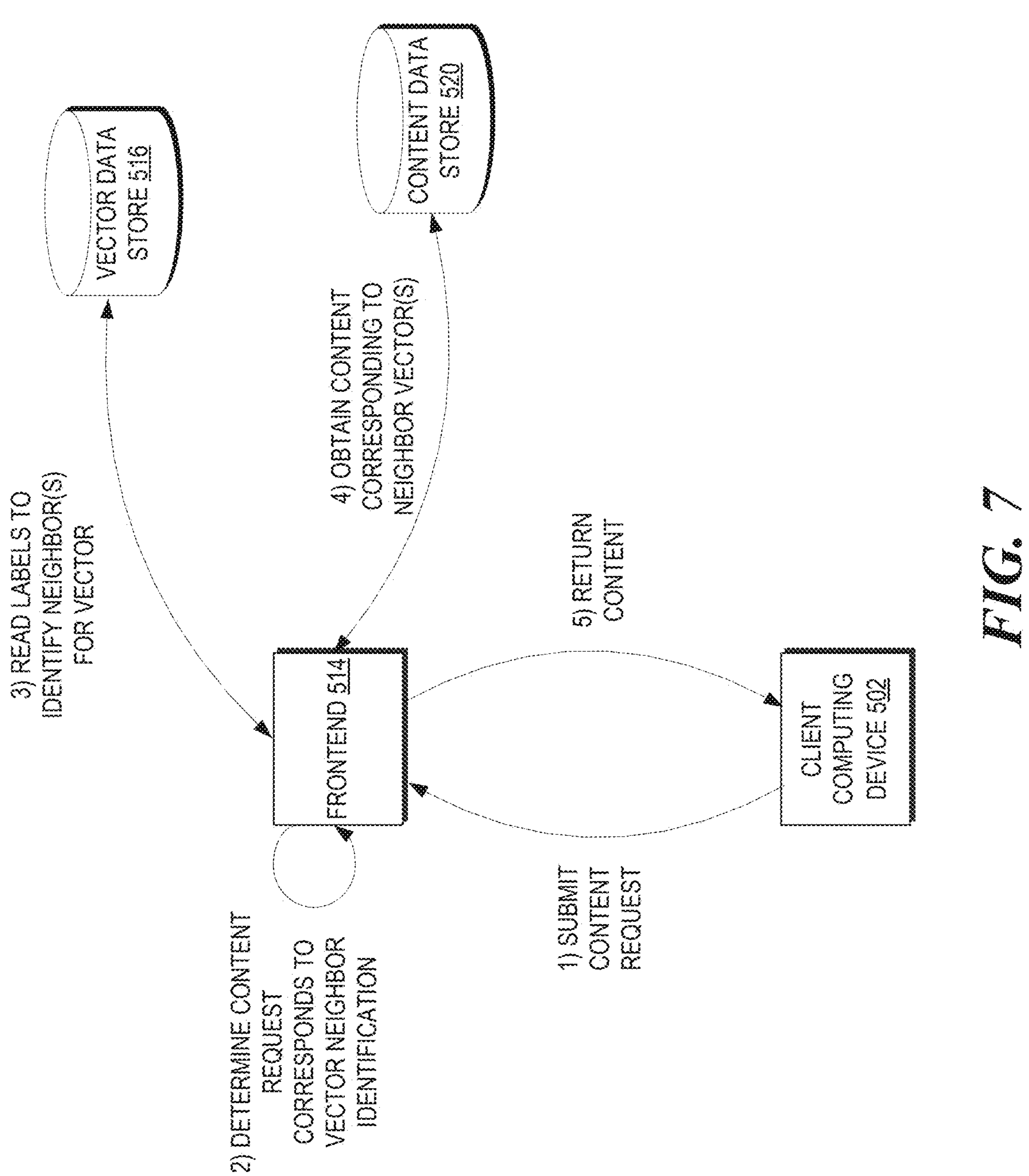
FIG. 7 depicts illustrative interactions for utilizing the information determined using an iterative partitioned clustering algorithm as disclosed herein for the delivery of content.

With reference to FIG. 7, illustrative interactions will be described for utilizing the information determined using an iterative partitioned clustering algorithm as disclosed herein for the delivery of content. For example, the interactions of FIG. 7 may utilize the labels generated via the interactions of FIG. 6. Specifically, at (1), a client computing device 502 submits a request for content to the frontend 514 of a network accessible service 512. As one example, the request may be a request for a home page or other screen of an application execution on the client computing device 502, which page or screen includes content recommendations (e.g., movies, music, shows, physical goods, services, etc.) that are based on prior content viewed, consumed, obtained, or the like by a user of the client computing device 502. Accordingly, the network accessible service 512 may be configured to identify content to recommend to the user based on a similarity to the prior content, as measured by a distance metric (e.g., cosine similarity, Euclidean distance, etc.) between vector representations of the prior content and the recommended content. Because clusters of similar items can be determined based on such a distance metric using a partitioned clustering algorithm as disclosed herein, the labels generated by such an algorithm can therefore be used to quickly and efficiently identify similar content.

Accordingly, at (2), the frontend 514 determines that the content request corresponds to a vector neighbor identification process. For example, the frontend 514 may identify a "seed" content item, such as an item consumed by, obtained by, or indicated as preferred by a user and determine that additional content items similar to that seed content item should be identified.

At (3), the frontend 514 therefore reads from the vector data store 516 labels of the vectors stored therein to identify neighbor vectors to the vector of the seed content item. Illustratively, the seed content item may include a label designating a particular cluster (e.g., cluster c) to which the content item has been assigned according to an implementation of a partitioned clustering algorithm. The frontend 514 can therefore read from the vector data store 516 one or more other vectors (corresponding to different respective content items) with the same label (a "neighbor vector"), which represent vectors determined by the partitioned clustering algorithm to be similar to the vector for the seed content item. In some instances, the frontend 514 may read from the vector data store 516 only identification data for the vector (e.g., a globally unique identifier) rather than reading the entire vector or quantitative aspects of the vector.

At (4), the frontend 514 then obtains from the content data store 520 the content corresponding to the neighbor vector. For example, the frontend 514 may obtain a content corresponding to a description of a song, movie, television show, physical good, service, etc. represented by the neighbor vector. As this content has been determined to be similar to the seed content, it may be determined for recommendation to the user.

At (5), the frontend 514 then returns the content to the client computing device 502. Accordingly, the client computing device 502 can output the content to the user. For example, the device 502 may output a recommendation that the user consume or obtain a particular content item determined to be similar to the seed content.

While FIG. 7 depicts use of vector similarity distinctly from identification of similar vectors (e.g., as in FIG. 6), in some instances these interactions may occur concurrently or simultaneously. For example, the interactions of FIG. 6 may occur in response to a request to read labels from the vector data store 516, such that the labels identified according to the interactions of FIG. 6 are returned in response to the request. In other instances, the interactions of FIG. 6 may occur independent of the interactions of FIG. 7, such as before the interactions of FIG. 7 and potentially reoccurring (e.g., at regular intervals). This may be referred to as "offline" or "asynchronous" implementation.

Figure 8:
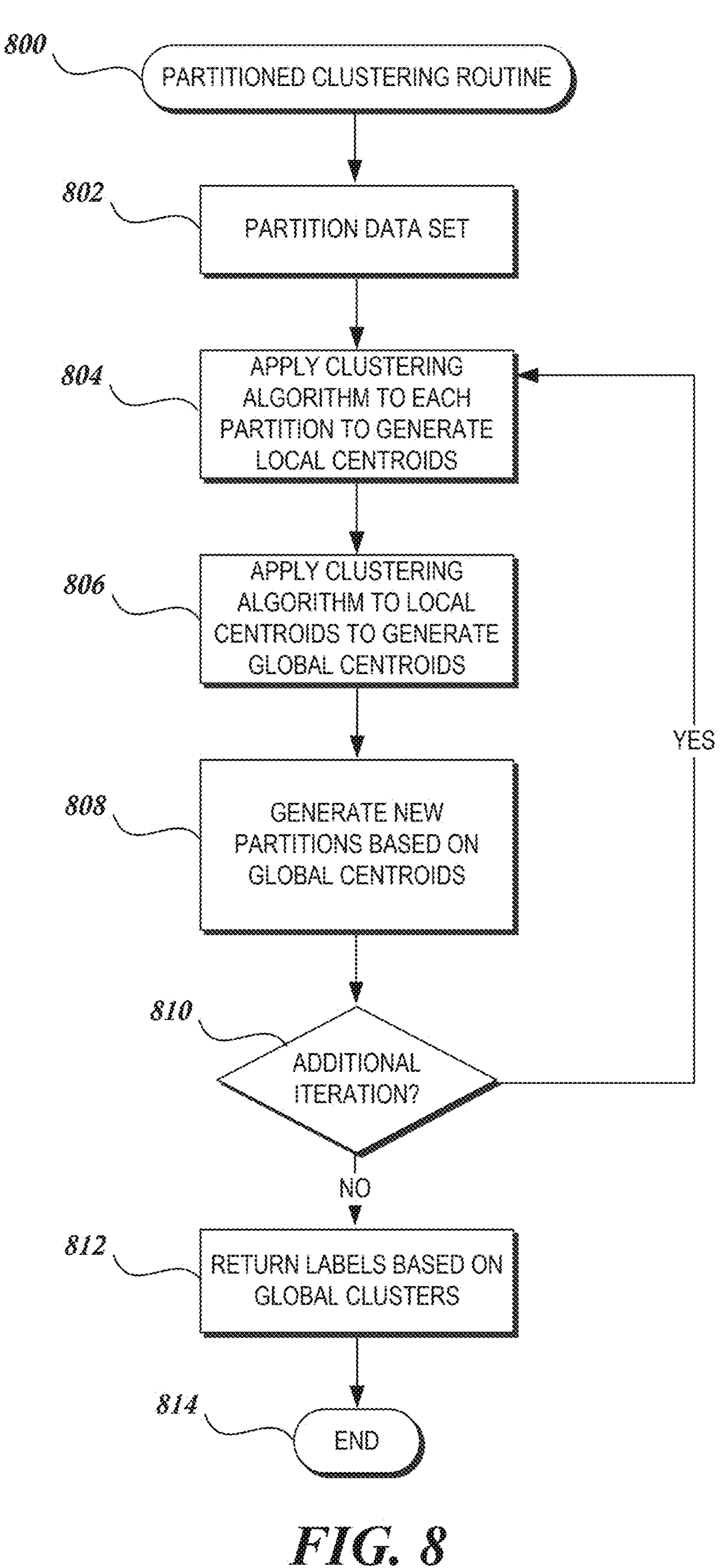
FIG. 8 depicts an illustrative routine for implementing partitioned clustering.

With reference to FIG. 8, an illustrative routine 800 for implementing partitioned clustering will be described. The routine 800 may be implemented, for example, by the clustering systems 518 of FIG. 5. In one example, the routine 800 implements the data processing operations described above with respect to FIGS. 1-4, and therefore enables clustering or grouping of data items within a data set into a number of clusters of quantitatively similar data items.

The routine 800 begins at block 802, where the clustering systems 518 partition a data set of data items, each data item represented as a multidimensional set of attribute values (e.g., a vector). Any number of partitioning mechanisms may be implemented. In one embodiment, initial partitioning is random, such as by application of a hash function to one or more attribute values of each data item. The number of partitions is illustratively a configurable parameter equal to the granularity of clustering desired as an output of the routine 800. For example, where a dataset of n data items is to be clustered into k clusters, the number of partitions can be set to k. In one embodiment, an individual clustering system 518 is designated as a coordinator system and assigns to individual clustering systems 518 responsibility for processing a particular partition of the data set.

Thereafter, at block 804, the clustering systems 518 apply to each subset a base clustering algorithm to generate local centroids. As discussed above, the base clustering algorithm may be any of a number of known clustering algorithms, such as k-means, k-medians, CLARANS, DBSCAN, or hierarchical and agglomerative clustering. Within each subset, application of the base clustering algorithm results in identification of "local clusters", such as clusters 204 of FIG. 2. The number of local clusters is illustratively a configurable parameter that is independently configurable. In one embodiment, the number of local clusters is constant. In another embodiment, the number of local clusters is dynamic based, e.g., on the number of objects to be clustered. For example, the number of local clusters may be equal to the square root of the number of objects multiplied by a predefined value (e.g., 1, 2, or more). As noted above, increasing the number of local clusters (e.g., by setting the constant or predefined value to a higher number) can generally increase a speed of convergence of the iterative partitioned clustering algorithm disclosed herein; however, increasing the number of local clusters may also increase computational complexity In various embodiments, the number of local clusters can be fewer, the same as, or greater than the number of subsets. Each base clustering algorithm either inherently includes or otherwise enables identification of a local centroid for each local cluster (depicted as local centroids 206 of FIG. 2). As discussed above, the local centroid of a local cluster represents a "center" of the data items in the cluster, according to a weighting of the locations of the data items within the cluster in multidimensional space. As also discussed above, block 804 represents a highly parallelizable operation, such that individual clustering systems 518 can implement the block with respect to a given subset independently.

At block 806, the clustering systems 518 apply a base clustering algorithm to the local centroids to generate global centroids. Block 806 is therefore similar to block 804, except that the base clustering algorithm is applied to local centroids as opposed to individual data items and therefore results in global centroids as opposed to local centroids. This clustering is illustrated, for example, in FIG. 3, above. In one instance, block 806 is implemented in the same manner as block 804 (e.g., using the same base clustering algorithm, the same centroid determination mechanism, etc.). In another instance, block 806 is implemented in a different manner to block 804 (e.g., using a different base clustering algorithm, different centroid determination mechanism, etc.). In one example, block 806 is implemented by a single clustering system 518 using data identifying the local centroids, as identified by one or more other clustering systems 518. For example, block 806 may be implemented by the clustering system 518 which acted as a coordinator at block 802. Because distinct clustering systems 518 may be required only to communicate local centroids (as opposed to data on all data items), synchronization and communication among clustering systems 518 can be highly efficient and require relatively few resources as compared to other distributed clustering algorithms. As a result of clustering the local centroids at block 806, the clustering systems 518 identify global centroids.

At block 808, the clustering systems 518 generates new partitions based on the identified global centroids. Specifically, a new subset or partition can be generated for each global centroid, which new subset or partition is populated with data items corresponding to a local centroid clustered within the global centroid. That is, if a particular partition corresponds to global centroid a, which represents a clustering of local centroids x, y, and z, the new partition can include data items clustered within the clusters corresponding to local centroids x, y, and z. The generation of new partitions is illustratively depicted in FIG. 4, above. As discussed above, in some instances the routine 800 may omit identification of global centroids and instead rely on global clusters. In such instances, new partitions can be generated based on the identified global clusters, with each new subset or partition populated with data items corresponding to a local centroid clustered within the global cluster.

Thereafter, the routine 800 varies according to whether an additional iteration is to be implemented, as determined at block 810. A number of iterations can be set as a configurable parameter. In various examples, the number of iterations is 1, 2, 3, 4, or more. Whether an additional iteration is to be implemented is illustratively determined by the clustering systems 518 (e.g., by an individual clustering system 518 acting as a coordinator). If an additional iteration is to be implemented, the routine 800 returns to block 804, where blocks 804 through 808 are again implemented with respect to the newly generated partitions. As discussed above, additional iterations of these blocks can cause the partitions to more closely match the results of a base clustering algorithm, while maintaining the efficiency and parallelizability of the partitioned clustering algorithm disclosed herein. However, additional iterations may require additional computational resources. Accordingly, the number of iterations can be tuned according to the resources available and the desired clustering accuracy.

Once no further iterations are to be implemented, the routine 800 proceeds to block 812, where labels are returned based on the identified global clusters. Specifically, each data item within a local cluster corresponding to a given global cluster can be labeled as similar. That is, if a particular global cluster represents a clustering of local centroids x, y, and z, data items clustered within the clusters corresponding to local centroids x, y, and z can be labeled with a shared label, indicating that such data items are clustered. As a result, the global clusters represent quantitatively similar data items within the data set. The routine 800 then ends at block 814.

Notably, the routine 800 results in global clustering of data items within a data set. However, individual blocks of the routine 800 do not require that data items within the data set be compared globally against one another. Accordingly, the routine 800 enables a global quantitative comparison of data items within a data set in a highly efficiently, parallelizable manner.

In the above description of FIG. 8, any blocks described can include alternate implementations within the scope of the example embodiments of the present disclosure in which the blocks can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 9:
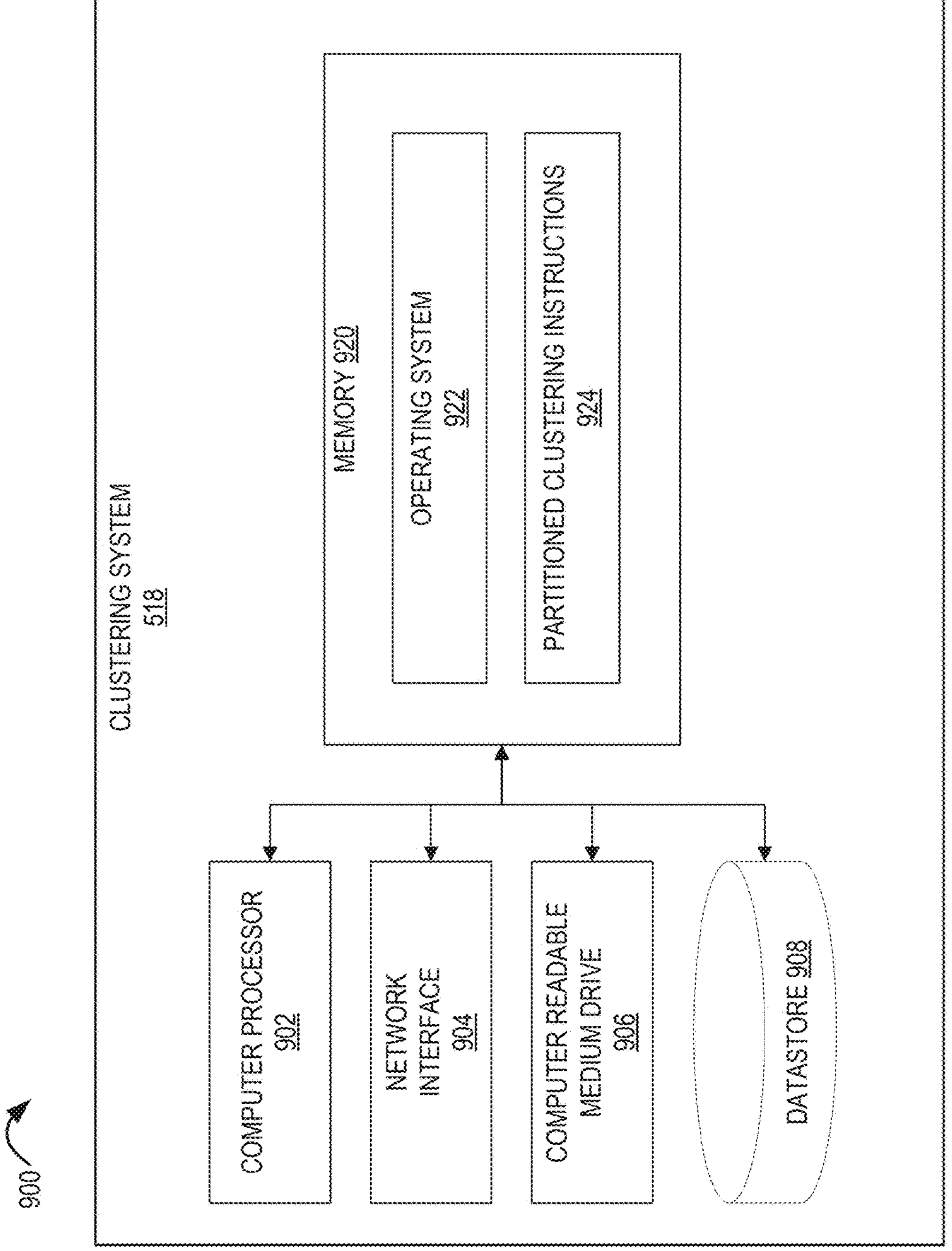
FIG. 9 illustrates various components of an example computing device configured to implement various functionality of a clustering system.

FIG. 9 illustrates various components of an example computing device 900 configured to implement various functionality of a clustering system 518. In some embodiments, as shown, the clustering system 518 may include: one or more computer processors 902, such as physical central processing units ("CPUs"); one or more network interfaces 904, such as a network interface cards ("NICs"); one or more computer-readable medium drives 906, such as a high density disk ("HDDs"), solid state drives ("SSDs"), flash drives, and/or other persistent non-transitory computer-readable media; one or more datastore 908, such as physical storage and/or remote storage, and/or other data storage components; and one or more computer-readable memories 920, such as random access memory ("RAM") and/or other volatile non-transitory computer-readable media.

The computer-readable memory 920 may include computer program instructions that one or more computer processors 902 execute in order to implement one or more embodiments. The computer-readable memory 920 can store an operating system 922 that provides computer program instructions for use by the computer processor(s) 902 in the general administration and operation of the clustering system 518. In some embodiments, the computer-readable memory 920 can further include computer program instructions and other information for implementing aspects of the present disclosure. For example, the computer-readable memory 920 may include partitioned clustering instructions 924 for implementing a partitioned clustering algorithm, as described herein. When a routine is initiated, a corresponding set of executable program instructions stored on a computer-readable medium drive 906 may be loaded into computer-readable memory 920 and executed by one or more computer processors 902. In some embodiments, a routine—or portions thereof—may be implemented on multiple computing devices and/or multiple processors, serially or in parallel.

All of the methods and jobs described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and jobs may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method (including computer-implemented method), process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for clustering a data set including a plurality of vectors, each vector associated with a content item and representing quantitative attributes of the content item as a multidimensional value, the system comprising:
- a data store storing the plurality of vectors; and
- a processor in communication with the data store and configured with computer-executable instructions to:
  - divide the plurality of vectors into multiple partitions, each partition including a subset of vectors from the plurality of vectors;
  - for each iteration of multiple iterations:
    - apply a clustering algorithm to each partition of the multiple partitions to identify a set of local centroids for each partition, each local centroid of the set of local centroids clustering a subset of vectors of a partition;
    - apply the clustering algorithm to an aggregation of the sets of local centroids from the multiple partitions to identify a set of global centroids, each global centroid of the set of global centroids clustering a subset of local centroids from the aggregation;
    - update the multiple partitions based on the set of global centroids, wherein each partition of the multiple partitions is updated to include vectors associated with a distinct global centroid of the set of global centroids, and wherein a vector is associated with a particular global centroid of the set of global centroids when the vector is clustered within a local centroid that is clustered within the particular global centroid; and
  - subsequent to a final iteration of the multiple iterations, output labels for individual vectors of the plurality of vectors, the labels reflective of the partition of the multiple partitions that includes an individual vector.

2. The system of claim 1, wherein the clustering algorithm is at least one of k-means, k-medians, Clustering Large Applications based upon RANdomized Search (CLARANS), hierarchical and agglomerative clustering, or spatial clustering (e.g., Density-Based Spatial Clustering of Applications with Noise or "DBSCAN").

3. The system of claim 1, wherein to divide the plurality of vectors into multiple partitions, the processor is configured to apply a hash function to individual vectors of the plurality of vectors.

4. The system of claim 1, wherein the processor comprises multiple processors, and wherein to apply the clustering algorithm to each partition of the multiple partitions, individual processors are configured to apply the clustering algorithm to distinct partitions as parallelized operations.

5. A computer-implemented method comprising:
- obtaining information identifying a plurality of vectors, each vector representing a multidimensional value;
- dividing the plurality of vectors into multiple partitions, each partition including a subset of vectors from the plurality of vectors;
- applying a first clustering algorithm to each partition of the multiple partitions to identify a set of local centroids for each partition, each local centroid of the set of local centroids clustering a subset of vectors of a partition;
- applying a second clustering algorithm to an aggregation of the sets of local centroids from the multiple partitions to identify a set of global clusters, each global cluster of the set of global clusters clustering a subset of local centroids from the aggregation;
- updating the multiple partitions based on the set of global clusters, wherein each partition of the multiple partition is updated to include vectors associated with a distinct global cluster of the set of global clusters, and wherein a vector is associated with a particular global cluster of the set of global clusters when the vector is clustered within a local centroid that is clustered within the particular global cluster; and
- outputting labels for individual vectors of the plurality of vectors, the labels reflective of the partition of the multiple partitions that includes an individual vector.

6. The computer-implemented method of claim 5, wherein dividing the plurality of vectors into multiple partitions comprises applying modulus division to individual vectors of the plurality of vectors.

7. The computer-implemented method of claim 5, wherein dividing the plurality of vectors into multiple partitions comprises dividing the plurality of vectors at a coordinator computing device, and wherein the computer-implemented method further comprises distributing instructions from the coordinator computing device to a plurality of additional computing devices to apply the first clustering algorithm to each partition of the multiple partitions.

8. The computer-implemented method of claim 7 further comprising transmitting the set of local centroids for each partition from the plurality of additional computing devices to the coordinator computing device, and wherein applying the second clustering algorithm to the aggregation of the sets of local centroids from the multiple partitions comprises applying the second clustering algorithm at the coordinator computing device.

9. The computer-implemented method of claim 5, wherein the first clustering algorithm and the second clustering algorithm are the same algorithm.

10. The computer-implemented method of claim 5 further comprising, prior to outputting the labels for individual vectors of the plurality of vectors and subsequent to updating the multiple partitions, iteratively repeating application of the first clustering algorithm to each partition of the multiple partitions, application of the second clustering algorithm to an output of the first clustering algorithm, and updating of the multiple partitions based on an output of the second clustering algorithm, wherein the labels for individual vectors of the plurality of vectors are based on the multiple partitions as updated after multiple iterations.

11. The computer-implemented method of claim 5, wherein the number of global clusters is equal to the number of partitions.

12. The computer-implemented method of claim 5, wherein the number of local centroids is greater than the number of partitions.

13. The computer-implemented method of claim 5 further comprising:

obtaining a request for content;

identifying a first vector of the plurality of vectors associated with the request for content;

selecting a second vector of the plurality of vectors that shares a label with the first vector;

identifying content associated with the second vector; and returning the content associated with the second vector in response to the request for content.

14. One or more computer-readable non-transitory media including computer executable instructions that, when executed by a computing system, cause the computing system to:

obtain information identifying a plurality of vectors, each vector representing a multidimensional value;

divide the plurality of vectors into multiple partitions, each partition including a subset of vectors from the plurality of vectors;

apply a first clustering algorithm to each partition of the multiple partitions to identify a set of local centroids for each partition, each local centroid of the set of local centroids clustering a subset of vectors of a partition;

apply a second clustering algorithm to an aggregation of the sets of local centroids from the multiple partitions to identify a set of global clusters, each global cluster of the set of global clusters clustering a subset of local centroids from the aggregation;

update the multiple partitions based on the set of global clusters, wherein each partition of the multiple partition is updated to include vectors associated with a distinct global cluster of the set of global clusters, and wherein a vector is associated with a particular global cluster of the set of global clusters when the vector is clustered within a local centroid that is clustered within the particular global cluster; and output labels for individual vectors of the plurality of vectors, the labels reflective of the partition of the multiple partitions that includes an individual vector.

15. The one or more non-transitory computer-readable media of claim 14, wherein the instructions cause the computing system to iteratively repeat application of the first clustering algorithm to each partition of the multiple partitions, application of the second clustering algorithm to an output of the first clustering algorithm, and updating of the multiple partitions based on an output of the second clustering algorithm, and wherein the labels for individual vectors of the plurality of vectors are based on the multiple partitions as updated after multiple iterations.

16. The one or more non-transitory computer-readable media of claim 14, wherein the instructions cause the computing system to divide the plurality of vectors at a coordinator computing device, and wherein the instructions further cause the computing system to distribute instructions from the coordinator computing device to a plurality of additional computing devices to apply the first clustering algorithm to each partition of the multiple partitions.

17. The one or more non-transitory computer-readable media of claim 16, wherein the instructions further cause the computing system to transmit the set of local centroids for each partition from the plurality of additional computing devices to the coordinator computing device, and wherein to apply the second clustering algorithm to the aggregation of the sets of local centroids from the multiple partitions, the instructions cause the coordinator computing device to apply the second clustering algorithm.

18. The one or more non-transitory computer-readable media of claim 14, wherein the instructions further cause the computing system to:

obtain a request for content;

identify a first vector of the plurality of vectors associated with the request for content;

select a second vector of the plurality of vectors that shares a label with the first vector;

identify content associated with the second vector; and return the content associated with the second vector in response to the request for content.

19. The one or more non-transitory computer-readable media of claim 14, wherein the computing system comprises multiple processors, and wherein to apply the first clustering algorithm to each partition of the multiple partitions, the instructions configure individual processors to apply the first clustering algorithm to distinct partitions as parallelized operations.

20. The one or more non-transitory computer-readable media of claim 14, wherein to divide the plurality of vectors into multiple partitions, the instructions cause the computing system to randomly divide the plurality of vectors into multiple partitions.

* * * * *